Figure 2:
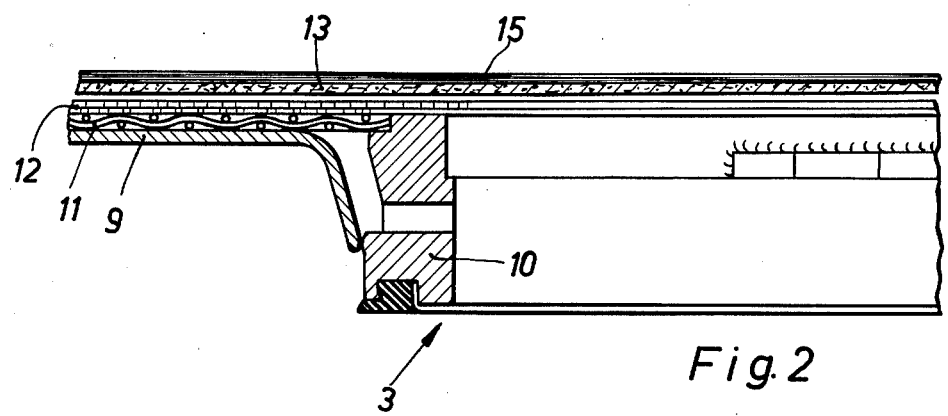

United States Patent [19]

Baur

[11] 4,201,670
[45] May 6, 1980

[54] METHOD OF AND DEVICE FOR FILTERING LIQUIDS

[75] Inventor: Rolf Baur, Lautern, Fed. Rep. of Germany

[73] Assignee: Schenk-Filterbau Gesellschaft mit beschränkter Haftung, Waldstetten, Fed. Rep. of Germany

[21] Appl. No.: 875,297

[22] Filed: Feb. 6, 1978

[30] Foreign Application Priority Data

Feb. 8, 1977 [DE] Fed. Rep. of Germany ....... 2705046

[51] Int. Cl.² .............................................. B01D 33/26
[52] U.S. Cl. ........................................ 210/75; 210/77; 210/331
[58] Field of Search .................... 210/75, 77, 324, 330, 210/331

[56] References Cited

U.S. PATENT DOCUMENTS

| 3,190,449 | 6/1965 | Muller | 210/331 X |
| 3,540,597 | 11/1970 | Gaudfrin | 210/331 |
| 3,549,523 | 12/1970 | Gilard et al. | 210/75 X |
| 3,884,805 | 5/1975 | Bagdasarian et al. | 210/75 X |

Primary Examiner—William A. Cuchlinski, Jr.
Attorney, Agent, or Firm—Becker & Becker, Inc.

[57] ABSTRACT

A method of and device for filtering liquids according to which the liquid to be filtered together with an auxiliary filter substance, e.g. Kieselguhr, is introduced into a filter tank including filter elements arranged in spaced superimposed relationship to each other and located on a filter shaft. The auxiliary filter substance, e.g. Kieselguhr, which has a flow and sedimentation speed settles on the filter elements while forming deposits which form filtering layers for the liquid to be filtered. The filtered liquid is withdrawn from the lower region of the filter tank. A transverse flow extending transverse to the sedimentation speed of the liquid to be filtered is superimposed upon the sedimentation speed including the auxiliary filter substance.

11 Claims, 2 Drawing Figures

METHOD OF AND DEVICE FOR FILTERING LIQUIDS

The present invention relates to a method of and device for filtering liquids according to which the liquid to be filtered is together with an auxiliary filtering substance for instance diatomaceous earth introduced into a filter tank with filter elements arranged in spaced relationship to each other and on a filter shaft. More specifically, the present invention concerns a method of and device of the above mentioned general type, according to which the auxiliary filtering substance having a flow and sedimentation velocity settles on the filter elements while forming sediments or deposits. These sediments or deposits serve as filtering layers for the liquid to be filtered. The filtered fluid is withdrawn in the lower region of the filter tank.

The device according to the invention for carrying out the above mentioned method comprises a filter container which includes filter plates which are spaced from each other and are located horizontally one above the other, said filter plates being supported by a rotatable filtrate to such shaft.

According to a heretofore known method of the above mentioned general type, a filter layer is built up on the filter elements during the filtering operation. This filter layer comprises primarily diatomaceous earth and a so-called coarse guhr as first deposit and a finer guhr or guhr mixture as second deposit. The liquid to be filtered such as beer, water or a non-filtrate is introduced by a dosing device together with the auxiliary filtering substance, and more specifically is fed into the filter container either from above or from below.

By a corresponding flow brought about by the pressure drop between the filter container and the filtering discharge shaft, the auxiliary filtering substance is deposited on the filter elements. The deposit of the auxiliary filtering substance on the filter elements depends on the flow and sedimentation speed. The deposit or sediment, and in particular, the first deposit or coarse guhr is decisive for the quality of the subsequent filtration.

According to heretofore known methods, the mixture comprising depositing liquid and non-filtrate and auxiliary filtering substance is with upright filter elements introduced into the filter container, and the deposits are built up on the filter elements. This process takes place in a cycle with continuous dosing. The liquid with the auxiliary filtering substance or substances passes through the inlet for the turbid substance into the filter container while the filtering auxiliary substance is deposited on the filter elements whereas the liquid is passed over the filtrate draining or discharge shaft and through the clear flow conduit is by means of the dosing device again conveyed to the inlet for the turbid substance. With such depositing operation, already during the inflow of the liquid, currents are generated at the connection for the admission of turbid substance, which currents affect the uniform deposit and position of the auxiliary filtering substance on the filter element. The direction and magnitude of the resulting velocity of sedimentation and flow speed of the auxiliary filtering substance is very much influenced by these currents. In the filter container there are provided sight glasses, connections and the like which likewise cause non-controllable currents within the filter container. In view of these currents, the auxiliary filter substances do not deposit uniformly upon the individual filter elements so that the deposits on the filter elements and within the entire filtering packet have different thicknesses. Due to these different thicknesses of the deposits, the quality of the filtration is greatly reduced.

It is, therefore, an object of the present invention to provide a method and device of the above mentioned general type so that filter layers of substantially even thickness will be built up on the filter elements.

Figure 1:
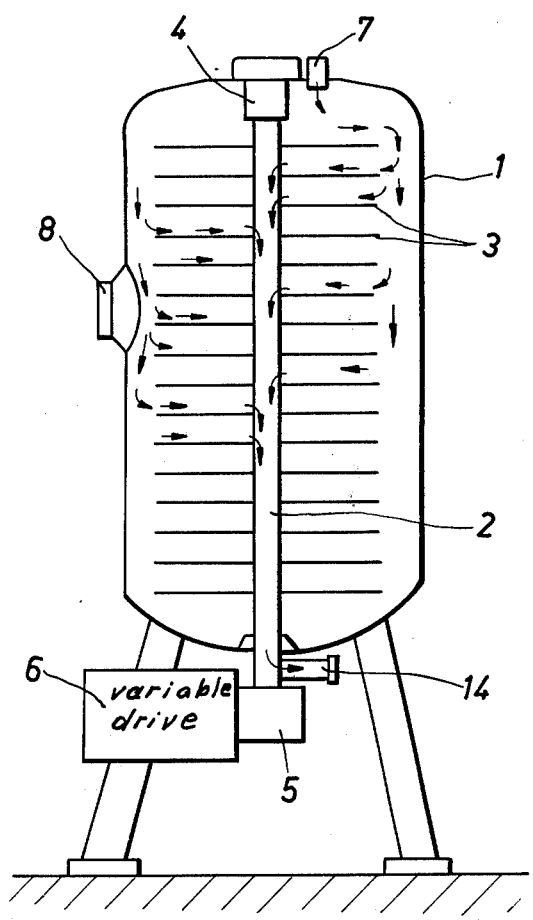

These and other objects and advantages of the invention will appear more clearly from the following specification in connection with the accompanying drawings, in which:

FIG. 1 diagrammatically illustrates an axial section through a device according to the present invention.

FIG. 2 represents a section through a portion of a filter element of the device according to FIG. 1.

The method according to the present invention is characterized primarily in that during the sedimentation, an additional component of movement is superimposed upon the liquid to be filtered, including the auxiliary filter substance, said additional component of movement having a direction transverse to the radial with regard to the filter shaft. By means of the superimposed transverse flow, a controlled deposit on the filter elements will be obtained so that over the entire filter packet a substantially even layer of auxiliary filtering substance is deposited. The non-controllable currents occurring within the filter container are superimposed by the transverse flow so that said non-controllable currents will not be noticeable. The transverse current can in conformity with the size of the filter container and the type of filtering auxiliary means be so controlled that deposits of uniform thickness are built up on the filter elements as a result of which the quality of the filtrate is considerably improved. Up to the end of the filter operation, the quality of the filtrate remains the same in view of the uniform layer thickness of the deposits so that at the end of the filtering operation, prior to the removal of the filter connection from the filter elements, the filtrate will have the same quality as it had at the start of the filtering.

The device for practicing the method according to the invention is characterized primarily in that the filtering elements are adapted to be driven by a controllable driving device. By the rotation of the filter elements about the axis of the filter draining shaft, thus within the filter container, a controlled flow is generated which is superimposed upon the sedimentation and flow speed of the filtering auxiliary substance. By rotation of the filter elements it can thus be obtained that over the entire height of the filter container a uniformly thick deposit takes place on the filter elements.

Referring now to the drawing in detail, the device according to the present invention comprises a filter container 1 having a circular cross section and having centrally arranged therein a filtrate draining or discharge shaft 2. Connected to said shaft 2 are horizontal filter plates 3 vertically spaced from each other but of uniform construction. These filter plates 3 have a circular contour. The upper end of the filtrate draining shaft 2 is supported in a bearing 4. The lower end of shaft 2 is through a transmission 5 connected with a controllable drive 6 by means of which the speed of rotation of shaft 2 can be varied. Advantageously, the drive 6 may be a hydraulic drive. The upper or lower ends of the filter container 1 (in the drawing shown only at the upper end) are provided with an inlet 7 through which the liquid to be filtered together with the auxiliary filtering substance is introduced into the filtering container. Furthermore, the filter container 1 is provided with a sight glass 8 through the filtering elements 3 can be observed during the filtering operation.

The filtering elements 3 respectively have to their hub 10 connected a bottom plate 9 with a circular circumference, said bottom plate 9 having connected thereto a supporting fabric 11. Above said fabric 11 there is stretched a fine fabric 12 upon which the deposits settle. The hubs 10 of the filter elements 3 rest on the filtrate draining shaft 2. For purposes of filtering a liquid, for instance beer, the fluid to be filtered is introduced through the connection 7 together with an auxiliary filtering substance, customarily diatomaceous earth. As auxiliary filtering substance, in addition to diatomaceous earth, also perlite, cellulose, active carbon, synthetic resin and the like may be employed.

The liquid by way of a (non-illustrated) dosing device is intermixed with the auxiliary filtering substance, and filter container 1 is filled with the intermixed liquid, the so-called suspension. Due to the pressure drop between the filter container and the filtrate draining shaft 2, a flow is produced by means of which the auxiliary filtering substance is deposited upon the filtering elements 3. From the flow and sedimentation speed, a speed vector results which is devisive for the location of the auxiliary filtering substance on the filter element 3. First, the liquid is mixed with auxiliary filtering substance which settles as so-called first deposit 13 on the filter elements 3. The liquid to be filtered will within the auxiliary filter substance 13 flow into the filtrate draining shaft 2 (see arrows in FIG. 1). At the lower end of the filtrate draining shaft 2 there is provided an outlet 14 through which the filtering liquid is withdrawn from the filter container 1. During the introduction of the auxiliary filtering substance or medium 13, the filtrated liquid is from the outlet 14 again conveyed to the dosing device and is through the inlet 7 introduced into the container 1.

Important for the quality of the filtration is the auxiliary filter substance layer 13 which is known as the so-called precoat layer. This layer 13 should have the same thickness over the entire height of the filter container 1 and on each filter element 3.

According to the invention it is provided that within the filter container a controlled transverse flow or current is generated which is superimposed upon the flow and sedimentation speed of the auxiliary filter substance. Interfering currents occurring within the filter container can be compensated for by the superimposed transverse current so that the latter cannot do any harm. Such non-controllable interferences occur already during the intake of the liquid through the inlet 7. While interferences can be controlled by an intake distributor, they are, however, not fully controllable. At the sight glass 8, which extends into the flow path of the liquid, additional interfering currents occur which prevent a uniform deposit of the auxiliary filter substance on the filter elements 3. The precoat layer 13 would then have a different thickness so that the subsequent filtration would not occur under optimum conditions.

In view of the superimposition by the controlled transverse flow, it will now be realized that the auxiliary filter substance settles uniformly on the filter elements 3 so that the precoat layer 13 will have uniform thickness over the entire height of the filter container 1. The transverse flow will then form with the sedimentation speed of the auxiliary filter substance angles of from 0° to 90°. After the precoat layer 13 has been formed, the liquid in the dosing device which liquid is to be filtered, has added thereto additional auxiliary filter substances which then settles on the precoat layer 13 and forms a fine guhr layer 15, the so-called second deposit. Also when the fine guhr layer is being formed, due to the superimposed controlled transverse flow it will be assured that said transverse flow will over the entire height of the filter 1 have the same thickness regardless of the interfering currents within the filter container. As will be seen from FIG. 2, according to the method of the present invention, deposits are formed which have uniform thickness over the entire filter element 3. As a result thereof, a high quality filtration can be obtained which also at the end of the filtering operation furnishes the same results as in the starting phase of the filtration.

The transverse current which in the particular embodiment shown represents a circular current is realized by the rotation of the filter elements 3 by means of the controllable driving device 6, and extend substantially parallel to the top side of the filter elements 3. The resulting flow velocity of the liquid and of the auxiliary filtering substance is uniformly set over the entire height of the filter container so that over the container height uniform flow conditions exist which assure a uniform deposit upon the filter elements.

The speed of the filter elements 3 can be so set that the speed of rotation at each point of the filter elements is greater than the speed of rotation of the liquid. There will then be obtained a so-called smoothening effect. The filter cake forming on the two deposits 13 and 15 during the filtering operation is smoothened by the liquid while filter cake residues are continuously centrifuged off. In this way, also a filter cake layer can be formed with has the same constant thickness on all filter elements. As a result thereof, the quality of the filtering operation will be greatly enhanced.

For generating the controlled flow, a relatively low speed of the filter elements suffices which, dependent on the magnitude of the filter container admists to form 3 to 5 rpm. The speed can by means of the controllable driving device 6 be so set that the layers being built up on the filter elements 3 respectively have the same thickness.

At the end of the filtering operation, the filter cake which has settled on the filter elements 3 has to be centrifuged off by increasing the speed. By means of a hydraulic drive, the high speeds necessary for the centrifuging off operation, and the necessary low speeds of rotation during the filtering operation can be set without difficulties.

If desired, the device may also be so designed that for centrifuging off the filter cake, a non-variable drive may be employed, whereas for obtaining a controlled flow, an additional controllable drive is employed. Depending on the liquid to be filtered, the size of the filter container, and the like, it is possible by the controlled current to form a proper deposit on the filter elements 3 so that liquids can independently of the duration of employment, practically in a single passage, be so filtered that the filtrate meets the respective anti-pollution regulations.

It is, of course, to be understood that the present invention is, by no means, limited to the specific showing in the drawing, but also comprises any modifications within the scope of the appended claims.

What I claim is:

1. A method of filtering liquids in a filter tank with filter elements arranged in spaced superimposed relationship to each other and connected to a rotatable filtrate discharging shaft, which includes in combination the steps of: rotating radial, plane filter elements having uninterrupted, porous filtering surfaces and fixed to a hollow shaft with openings below said filtering surfaces to the interior of said shaft, each filter element including an impervious, flat metal plate with passages leading to said openings, introducing the liquid to be filtered together with an auxiliary filter substance so as to cause said auxiliary filter substance to settle in a sedimentation flow with substantially equal thickness on the filtering surfaces of said filter elements and form filtering layers deposited uniformly thereon for the liquid to be filtered, and during the sedimentation flow superimposing upon the liquid to be filtered including the auxiliary filer substance an additional component of movement extending transverse to the sedimentation flow and in radial direction with regard to the filter shaft, caused by rotation of said elements, and conducting the filtered liquid passing through said filter substance on said filtering surfaces through said passages and said openings to the interior of said shaft.

2. A method in combination according to claim 1, which includes: controlling said additional component of movement.

3. A method in combination according to claim 2, which includes: controlling the speed of said additional component of movement.

4. A method in combination according to claim 1, in which said additional component of movement is transverse to a radius from the filter discharging shaft in a circulating movement.

5. A method in combination according to claim 4, which includes rotating said filter elements to make said additional component of movement follow a circular path.

6. A method in combination according to claim 5, which includes the step of rotating said filter elements at a higher speed than the rotational speed of the liquid to be filtered.

7. A method in combination according to claim 6, which includes controlling said additional component of movement so as to cause the latter to follow a path about parallel to the top side of said filter elements.

8. A method in combination according to claim 1, in which said additional component of movement is a circular movement.

9. A method in combination according to claim 1, which includes: the step of so controlling the resulting flow velocity of the liquid to be filtered and of the auxiliary filter substance that the resulting flow velocity will be substantially the same over the total height of said filter elements.

10. A device for filtering liquids with an auxiliary filter substance settled with substantially equal thickness on filtering elements having filtering layers deposited uniformly andd formed thereon for the liquid to be filtered with an additional component of movement superimposed thereon transverse to sedimentation flow, which includes in combination: a tank having bearing means associated therewith and also having a fluid inlet for the liquid to be filtrated, a hollow shaft arranged in said tank and extending in substantially vertical direction while being rotatably journaled in said bearing means, a plurality of radial, plane filter elements, each element being formed with a hub connected to said shaft, an impervious metal plate fixed to said hub and extending radially from said shaft, and a porous filtering web on said plate having a thin fabric web with a plane, uninterrupted filtering surface deposited uniformly thereon, said element being connected to said hollow shaft for rotation therewith and for receiving liquid to be filtrated from said fluid inlet, conduit means between said filtering web and said plate of each filtering element connecting the filtering surface with the interior of said hollow shaft, including openings through said hub and passages between said plate and hub leading to said passages, said filtering surface of said filtering plate extending substantially perpendicular to the axis of said hollow shaft, said filter plates being arranged in spaced superimposed relationship to each other, and variable drive means drivingly connected to said hollow shaft for rotating the latter and controlling the speed of rotation of said hollow shaft. so as to cause a substantially even layer of auxiliary filtering substance to be deposited on said filter elements.

11. A device in combination according to claim 10, in which said drive means is a hydraulic drive.

* * * * *